United States Patent [19]

Bianchi et al.

[11] Patent Number: 4,559,829

[45] Date of Patent: Dec. 24, 1985

[54] DIFFERENTIAL PRESSURE TRANSMITTER FOR INDUSTRIAL PROCESS FLUIDS, PROVIDED WITH COMPENSATION OF STATIC PRESSURE CHANGE EFFECTS

[75] Inventors: Gianfranco Bianchi, S. Fermo Della Battaglia; Riccardo Borelli, Tremezzo; Piero Pierpaoli, Lenno, all of Italy

[73] Assignee: Kent-Tieghi S.p.A., Lenno, Italy

[21] Appl. No.: 624,514

[22] Filed: Jun. 25, 1984

[30] Foreign Application Priority Data

Jul. 8, 1983 [IT] Italy ................................ 21983 A/83

[51] Int. Cl.[4] .................... G01L 7/08; G01L 9/04; G01L 9/10
[52] U.S. Cl. ........................................ 73/708; 73/717; 73/720; 73/722; 338/4; 338/42
[58] Field of Search ................. 73/708, 719, 717, 718, 73/720, 721, 722; 338/4, 42

[56] References Cited

U.S. PATENT DOCUMENTS 4,172,387 10/1979 Ezekiel et al. .................... 338/42

Primary Examiner—Donald O. Woodiel
Attorney, Agent, or Firm—Wenderoth, Lind & Ponack

[57] ABSTRACT

A differential pressure transmitter for process fluids is of the kind having a measuring transducer with a closed cell containing a filling liquid and a measuring diaphragm on both sides of which are arranged resistive, capacitive or inductive elements which are capable of converting a diaphragm deflection induced by differential pressure applied to the cell into electrical quantity changes. Inside the cell is provided at least one pressure sensitive component which is subjected to the pressure (s) of the filling liquid and is capable of providing an electrical output in accordance with the pressure values. This component is preferably a pasted carbon resistor, which permits output processed signal compensations in an electronic processing circuit to be made so as to minimize the effects of static pressure changes.

4 Claims, 1 Drawing Figure

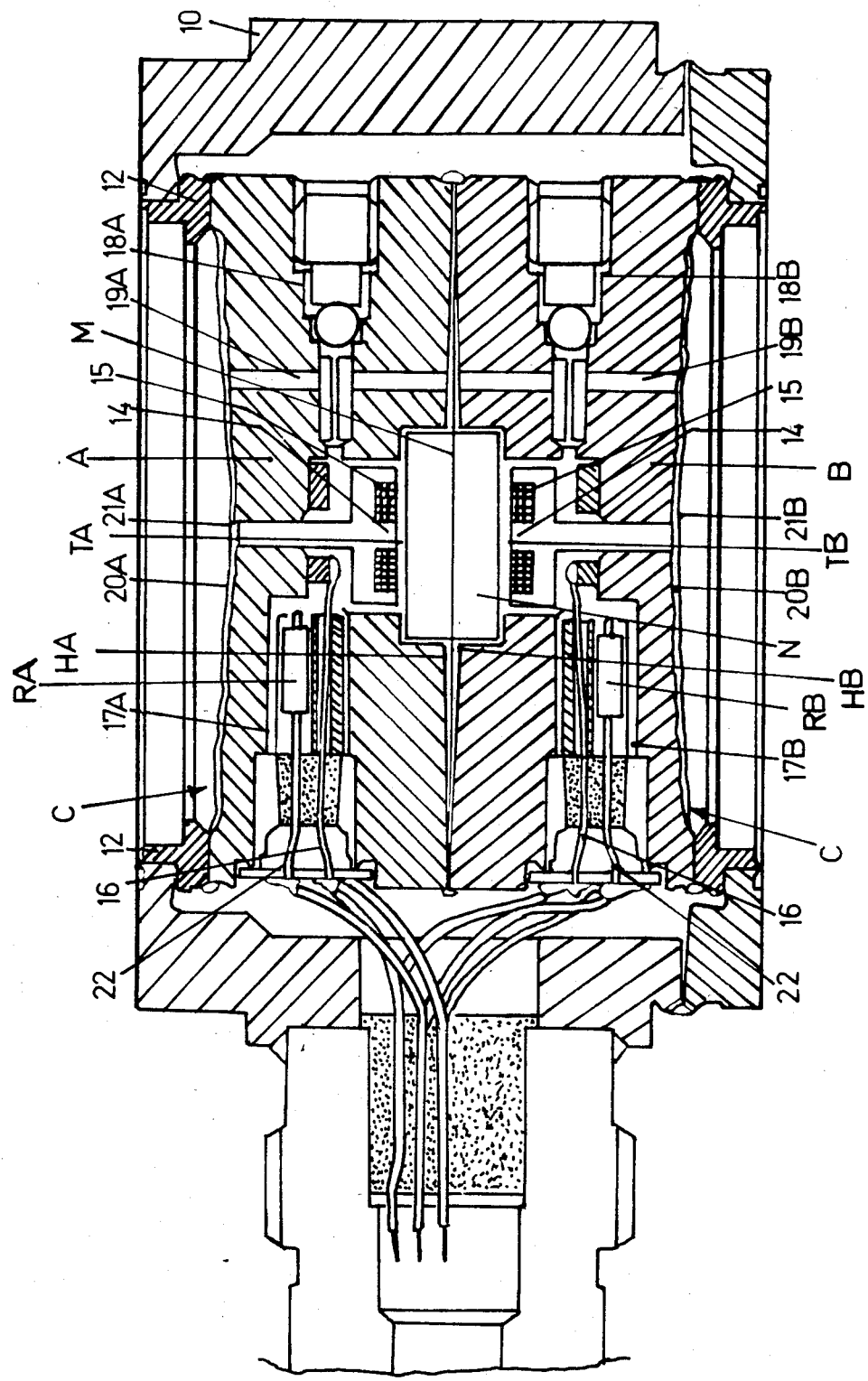

DIFFERENTIAL PRESSURE TRANSMITTER FOR INDUSTRIAL PROCESS FLUIDS, PROVIDED WITH COMPENSATION OF STATIC PRESSURE CHANGE EFFECTS

BACKGROUND OF THE INVENTION

1. Field of Invention

This invention generally relates to differential pressure measuring transmitters and, more particularly, to a transmitter of this type, which is capable of compensating for the effects of static pressure changes.

2. Description of the Prior Art

Transmitters used for transmitting differential pressure values are well known, and the most used ones can be roughly grouped in three types, namely inductive, capacitive and resistive transmitters, depending on the electric output quantity being proportional to an inductance, capacitance or resistance change, respectively.

Generally, at present, all the inductance, capacitance or resistance changes are transduced by electronic processing circuits providing also for a possible linear temperature change compensation.

These transmitters, providing from certain points of view good performances and a good measuring accuracy, are affected however with the disadvantage of suffering the effect of static pressure changes acting on both the mechanical components and the electrical sensors. This effect causes a zero offset and a linear characteristic slope change (normally a reduction) of the transmitter output (zero effect and field effect).

These disadvantages are either inherent to some of these measuring instruments and, unfortunately, have to be accepted by the users due to a lack of not yet provided compensation of the static pressure effect changes or they have been reduced, normally by weighting or complicating the mechanical structure, this, however, to the detriment of the cost of the instruments.

SUMMARY OF THE INVENTION

The present invention seeks to obviate the above mentioned disadvantage by providing a differential pressure transmitter capable of providing a reading in which the effects of static pressure changes are minimized by means of a simple and inexpensive compensation system of the electrical type.

These and other objects and advantages are attained by a differential pressure transmitter of the type having a measuring transducer with a closed cell containing a filling liquid and a metal diaphragm, to which are applied resistive or preferably inductive or capacitive elements which are capable of converting a diaphragm deflection induced by a differential pressure applied across the cell to electrical quantity changes, wherein inside the cell is provided at least one pressure sensitive element which is subjected to the filling liquid pressure (s) and is capable of providing an electric output in accordance with the pressure values.

According to a feature of the present invention this element is preferably a pasted carbon resistor.

BRIEF DESCRIPTION OF THE DRAWINGS

The sole FIGURE is a diametral section of the transducer according to this invention.

DESCRIPTION OF THE PREFERRED EMBODIMENT

Referring now to the drawing, the transducer consists of a central body C formed of a pair of similar and symmetrically opposed body halves A-B which are fastened to each other in a sealed relationship by welding, for example. Body C is fastened and clamped by means of an outer sleeve 10 bearing on the body C through contact means 12.

The two rigid half-bodies A and B are structured such that, once they are coupled and sealingly fastened to each other, a chamber is formed within which is disposed a measuring diaphragm M which is locked and sealed along its periphery between the two half-bodies. The measuring diaphragm M divides this chamber into two half-chambers HA and HB. The measuring diaphragm M includes a rigid block N formed of a suitable material exhibiting a high magnetic permeability.

Secured to each of the half-bodies A and B is a magnetic core 14 with an associated energizing electric coil 15, which cores face the magnetic block N forming part of the diaphragm M.

Coils 15 are a.c. supplied through leads 16 in order to produce a magnetic field the flux lines of which close through the associated magnetic core 14 and the rigid block N, thereby obtaining two magnetic circuits having the same electromagnetic values when the measuring diaphragm M is exactly in a rest condition and divides the chamber into two equal halves.

Each of the half-chambers HA and HB is provided with seats 17A, 18A and 17B, 18B respectively, in which bushings for the leads and fittings for admitting a filling liquid, for example silicone oil, into the half-chambers are housed. Provided in the half-bodies A and B are passages 19A, 19B opening at their inner ends into the associated half-chambers HA, HB and at their outer ends into spaces 20A, 20B externally defined by sealing diaphragms 21A, 21B, suitably welded and sealed to associated portions of half-bodies A and B. Passages 19A, 19B communicate also with the seats 18A, 18B containing the filling liquid admitting fittings. Therefore, by admitting the filling liquid through the fittings located in the seats 18A, 18B, this liquid will fill all the voids forming the half-chambers HA, HB, namely passages 19A, 19B, seats 18A, 18B and 17A, 17B, magnetic cores 14, air gaps TA, TB and the spaces between the half-bodies A, B and the center diaphragm M and the rigid block N.

Due to the two sealed diaphragms 21A, 21B, having high flexibility and high corrosion resistance, and due to the filling liquid, the differential pressure applied to the sealing diaphragms is transferred to the measuring diaphragm M which converts this differential pressure into a very small displacement of its rigid block N exhibiting a high magnetic permeability. This imperceptible deflection causes a change in the air gaps TA, TB of the two fixed opposite magnetic circuits formed of the magnetic cores 14 and the associated a.c. supplied coils 15. The difference between the initial and final values of the two resultant inductances represents a differential pressure measuring transducer output.

As already indicated, a transducer of this type does not provide a perfectly accurate output, because, as the static pressure changes, the output accordingly is affected by a zero offset and lower slope. It has been surprisingly found that, by arranging inside the cell static pressure sensitive sensors of electrical nature a reasonably linear output with the pressure is obtained. This permits a more than satisfactory compensation of the effects of static pressure changes on the transmitter output signal, by minimizing them. It has been found useful to employ as a static pressure sensitive sensor of electrical nature a pasted carbon resistor which is particularly sensitive to pressure changes. This electrical resistor is therefore loacted inside the body C of the transducer, namely in each of the seats 17A, 17B intended to receive the bushings of the leads. These resistors, indicated in the drawing as RA, RB, are subjected to the filling fluid pressure and therefore to static pressure changes to which the transducer is subjected during its use. Resistors RA and RB are connected to the transducer processing circuit via leads 22 which are passed outside the transducer to be applied to the processing circuit.

Therefore, it can be seen that, by resorting to a pair of simple resistors having the characteristic of being pressure sensitive, compensation of the output processed signal of the instrument can be obtained, which minimizes the effects of static pressure changes.

Of course, while the invention has been described and shown in the accompanying drawing as applied to a differential pressure measuring transducer of the inductive type only, it should be understood that the invention can be applied also to differential pressure measuring transducers of other types, such as the capacitive or resistive type, by a suitable choice of the pressure sensitive component of electrical nature to be applied inside the transducer body.

What is essential is that this component is arranged inside the transducer body, that is in a location in which it is subjected directly or through the filling fluid to the differential pressure.

It also should be understood that all the modifications and changes within the reach of one skilled in the art can be made to the described and illustrated embodiment without departing from the scope of the invention.

What is claimed is:

1. In a differential pressure transmitter of the type including a closed cell, a diaphragm dividing said cell into separate chambers, a liquid filling said chambers, means for applying different pressures to said liquid in said chambers and thereby causing a deflection of said diaphragm, and means in said chambers for converting said diaphragm deflection into an electrical output representative of the difference between said pressures, the improvement of means for compensating for static pressure changes of said different pressures, said compensating means comprising:

pressure sensitive means, located in at least one said chamber and separate from and independent of said converting means, for generating an electrical output as a function of changes in static pressure in said one chamber.

2. The improvement claimed in claim 1, wherein said pressure sensitive means comprises a pressure sensitive electrical resistor.

3. The improvement claimed in claim 2, wherein said resistor is of the pasted carbon type.

4. The improvement claimed in claim 2, comprising two said resistors, one in each said chamber.

* * * * *